(12) United States Patent
Ohira

(10) Patent No.: US 9,497,486 B2
(45) Date of Patent: Nov. 15, 2016

(54) IMAGE PROCESSING APPARATUS, IMAGE FORMING APPARATUS AND RECORDING MEDIUM

(71) Applicant: SHARP KABUSHIKI KAISHA, Osaka-shi, Osaka (JP)

(72) Inventor: Masakazu Ohira, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/307,813

(22) Filed: Jun. 18, 2014

(65) Prior Publication Data

US 2014/0376828 A1    Dec. 25, 2014

(30) Foreign Application Priority Data

Jun. 19, 2013    (JP) .................................. 2013-128932

(51) Int. Cl.
| | |
|---|---|
| H04N 19/85 | (2014.01) |
| H04N 19/134 | (2014.01) |
| H04N 19/136 | (2014.01) |
| H04N 19/146 | (2014.01) |
| H04N 19/194 | (2014.01) |

(52) U.S. Cl.
CPC ............ *H04N 19/85* (2014.11); *H04N 19/134* (2014.11); *H04N 19/136* (2014.11); *H04N 19/146* (2014.11); *H04N 19/194* (2014.11)

(58) Field of Classification Search
CPC ............. G09G 2340/02; G09G 5/397; H04N 19/134; H04N 19/136; H04N 19/146; H04N 19/194; H04N 19/85; H04N 19/115; H04N 19/593; G06T 11/008; G06T 15/06
See application file for complete search history.

(56) References Cited

U.S. PATENT DOCUMENTS

| | | | | | |
|---|---|---|---|---|---|
| 4,841,373 A | * | 6/1989 | Asami | ................ | H04N 1/32363 358/404 |
| 5,208,681 A | * | 5/1993 | Yoshida | ............. | H04N 1/32117 358/400 |
| 5,467,134 A | * | 11/1995 | Laney | ................. | H04N 19/577 348/409.1 |
| 5,751,358 A | * | 5/1998 | Suzuki | ................. | H04N 19/176 375/240.04 |
| 5,757,968 A | * | 5/1998 | Ando | ................... | H04N 19/503 348/700 |
| 5,864,673 A | * | 1/1999 | Ohto | .................. | H04L 12/5825 709/219 |
| 5,900,946 A | * | 5/1999 | Kunitake | ............. | H04N 21/236 358/405 |
| 6,909,436 B1 | * | 6/2005 | Pianykh | ................ | G06T 11/008 345/581 |
| 6,985,242 B1 | * | 1/2006 | Toyoda | ............. | H04N 1/00214 358/1.15 |
| 2002/0059643 A1 | * | 5/2002 | Kitamura | ............. | H04N 5/4401 725/136 |
| 2003/0067979 A1 | * | 4/2003 | Takahashi | ............. | H04N 19/56 375/240.03 |
| 2003/0160945 A1 | * | 8/2003 | Honda | ............. | H04N 21/23432 352/244 |

(Continued)

FOREIGN PATENT DOCUMENTS

| | | |
|---|---|---|
| JP | 2000-354167 A | 12/2000 |
| JP | 2002-232708 A | 8/2002 |

(Continued)

*Primary Examiner* — Jingge Wu

(74) *Attorney, Agent, or Firm* — Birch, Stewart, Kolasch & Birch, LLP

(57) ABSTRACT

An image processing apparatus includes a compression processing section that compresses image data obtained by reading a plurality of documents into a file, a specifying section that specifies an amount of information for an image of each of the plurality of documents, and a compression size calculation section that calculates a size after compression of an image of each document in accordance with the specified amount of information. The compression processing section compresses the image by using the size after compression calculated by the compression size calculation section.

4 Claims, 16 Drawing Sheets

(56) References Cited

U.S. PATENT DOCUMENTS

| | | | |
|---|---|---|---|
| 2007/0038464 A1* | 2/2007 | Sato | G05B 19/4183 358/1.17 |
| 2007/0127043 A1 | 6/2007 | Maekawa | |
| 2010/0073388 A1* | 3/2010 | Mostinski | G09G 5/363 345/558 |
| 2010/0259777 A1* | 10/2010 | Suzuki | G06K 9/2063 358/1.11 |
| 2011/0019974 A1* | 1/2011 | Konoshima | G11B 20/10527 386/284 |
| 2013/0251279 A1* | 9/2013 | Park | G06T 9/004 382/238 |

FOREIGN PATENT DOCUMENTS

| | | |
|---|---|---|
| JP | 2005-288571 A | 10/2005 |
| JP | 2007-158510 A | 6/2007 |

* cited by examiner

MINIMUM HISTOGRAM
(IN A CASE WHERE BACKGROUND AREA EXISTS)

MINIMUM HISTOGRAM
(IN A CASE WHERE BACKGROUND AREA DOES NOT EXIST)

FIG. 7

|  | TEXT PIXEL | CHROMATIC PIXEL | HALFTONE DOT PIXEL | PHOTOGRAPH PIXEL |
|---|---|---|---|---|
| NUMBER OF PIXEL | A | B | C | D |
| WEIGHT COEFFICIENT | $\alpha$ | $\beta$ | $\gamma$ | $\delta$ |
| AMOUNT OF INFORMATION | $E = \alpha \times A + \beta \times B + \gamma \times C + \delta \times D$ | | | |

F I G. 8

| PAGE | AMOUNT OF INFORMATION | RATIO W | COMPRESSION SIZE |
|---|---|---|---|
| 1st PAGE | E1 | $W1 = \dfrac{E1}{E1+E2+E3+E4}$ | PREDETERMINED SIZE × W1 |
| 2nd PAGE | E2 | $W2 = \dfrac{E2}{E1+E2+E3+E4}$ | PREDETERMINED SIZE × W2 |
| 3rd PAGE | E3 | $W3 = \dfrac{E3}{E1+E2+E3+E4}$ | PREDETERMINED SIZE × W3 |
| 4th PAGE | E4 | $W4 = \dfrac{E4}{E1+E2+E3+E4}$ | PREDETERMINED SIZE × W4 |

FIG. 9

| PAGE | TEXT PIXEL | CHROMATIC PIXEL | HALFTONE DOT PIXEL | PHOTOGRAPH PIXEL |
|---|---|---|---|---|
| 1st PAGE | 2688646 | 3982686 | 11880599 | 957507 |
| 2nd PAGE | 876613 | 1435654 | 4580790 | 745431 |
| 3rd PAGE | 1157696 | 2805375 | 6645288 | 580081 |
| 4th PAGE | 629915 | 10608271 | 16747759 | 440344 |

F I G. 1 0
1st PAGE
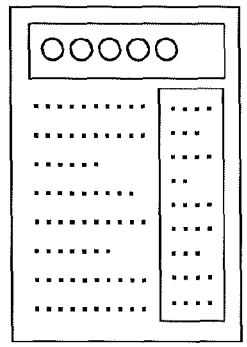
2nd PAGE
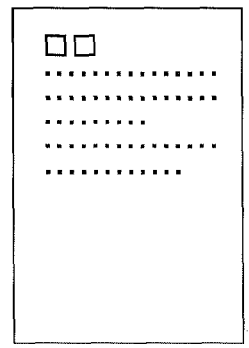
3rd PAGE
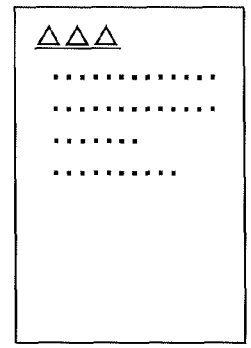
4th PAGE
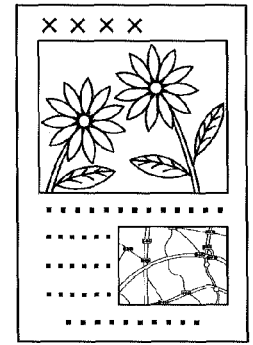

FIG. 11

| PAGE | CALCULATION OF AMOUNT OF INFORMATION | AMOUNT OF INFORMATION | RATIO | COMPRESSION SIZE |
|---|---|---|---|---|
| 1st PAGE | 2688646+0.5×3982686+0.1×11880599+0.05×957507 | 5915924.25 | 0.31 | 641Kbyte |
| 2nd PAGE | 876613+0.5×1435654+0.1×4580790+0.05×745431 | 2089790.55 | 0.11 | 226Kbyte |
| 3rd PAGE | 1157696+0.5×2805375+0.1×6645288+0.05×580081 | 3253916.35 | 0.17 | 352Kbyte |
| 4th PAGE | 629915+0.5×10608271+0.1×16747759+0.05×440344 | 7630843.6 | 0.40 | 827Kbyte |

PREDETERMINED FILE SIZE: 2048Kbyte

F I G. 1 3

|  | COLOR DOCUMENT | BLACK-AND-WHITE DOCUMENT |
|---|---|---|
| AMOUNT OF INFORMATION | Pc | Pm |

F I G. 1 4

| PAGE | DOCUMENT TYPE | AMOUNT OF INFORMATION E | RATIO W | COMPRESSION SIZE |
|---|---|---|---|---|
| 1st PAGE | COLOR DOCUMENT | Pc | $W1 = \dfrac{Pc}{2(Pc+Pm)}$ | PREDETERMINED SIZE × W1 |
| 2nd PAGE | BLACK-AND-WHITE DOCUMENT | Pm | $W2 = \dfrac{Pm}{2(Pc+Pm)}$ | PREDETERMINED SIZE × W2 |
| 3rd PAGE | BLACK-AND-WHITE DOCUMENT | Pm | $W3 = \dfrac{Pm}{2(Pc+Pm)}$ | PREDETERMINED SIZE × W3 |
| 4th PAGE | COLOR DOCUMENT | Pc | $W4 = \dfrac{Pc}{2(Pc+Pm)}$ | PREDETERMINED SIZE × W4 |

F I G. 1 5

| PAGE | AMOUNT OF INFORMATION BASED ON NUMBER OF PIXEL | WEIGHTING COEFFICIENT | AMOUNT OF INFORMATION TAKING DOCUMENT TYPE INTO ACCOUNT | RATIO | COMPRESSION SIZE |
|---|---|---|---|---|---|
| 1st PAGE | 5915924 | 3 | 17747772 | 0.39 | 798Kbyte |
| 2nd PAGE | 2089790 | 1 | 2089790 | 0.05 | 102Kbyte |
| 3rd PAGE | 3253916 | 1 | 3253916 | 0.07 | 143Kbyte |
| 4th PAGE | 7630843 | 3 | 22892529 | 0.49 | 1005Kbyte |

PREDETERMINED FILE SIZE : 2048Kbyte

IMAGE PROCESSING APPARATUS, IMAGE FORMING APPARATUS AND RECORDING MEDIUM

CROSS-REFERENCE TO RELATED APPLICATIONS

This Nonprovisional application claims priority under 35 U.S.C. §119(a) on Patent Application No. 2013-128932 filed in Japan on Jun. 19, 2013, the entire contents of which are hereby incorporated by reference.

BACKGROUND

The present invention relates to an image processing apparatus that includes a compression processing section for compressing image data obtained by reading a plurality of documents into a file, an image forming apparatus that includes the image processing apparatus, and a recording medium that records a computer program for realizing the image processing apparatus.

DESCRIPTION OF THE RELATED ART

When image data are made into electronic data obtained by reading documents with a scanner and electronic files are attached to an e-mail to be sent, it is desirable to compress images into sizes that are attachable to an e-mail at the time of creating electronic files because the capacity for attaching files to an e-mail is restricted. For example, it is possible to specify a size after compression in advance and compress it by using, for example, a compression method such as JPEG2000 as the system for realizing such requirement. In addition, a method for compressing a plurality of documents efficiently is disclosed (see Japanese Patent Application Laid-Open No. 2007-158510).

SUMMARY

However, with regard to the method described in Japanese Patent Application Laid-Open No. 2007-158510, the method improves the compression efficiency in a case of having common parts over a plurality of documents. In a case having no common parts over a plurality of documents, compression will be just as ordinary, causing a problem that cannot improve efficiency. In addition, a method for determining a size of each document when having no common parts over a plurality of documents is not disclosed.

Moreover, it is assumed that, in a case where images over a plurality of pages obtained by reading a plurality of documents are compressed into a file having a predetermined size designated beforehand, a size after compression of an image at each page is assigned equally and then the image is compressed. In this case, if the description amount such as characters and figures of each page is different, there is a problem that an image of a page with more description amount has larger deterioration than an image of a page with lesser description amount.

In view of such circumstances, an object of the present invention is to provide an image processing apparatus that can equalize image quality when compressing images over a plurality of pages, an image forming apparatus that includes the image processing apparatus, and a recording medium that records a computer program for realizing the image processing apparatus.

An image processing apparatus according to the present invention includes a compression processing section for compressing image data obtained by reading a plurality of documents into a file. The image processing apparatus is characterized by including a specifying section for specifying an amount of information of an image of each of the plurality of documents and a compression size calculation section for calculating a size after compression of the image in accordance with the amount of information specified by the specifying section. The image processing apparatus is characterized in that the compression processing section compresses the image data by using the size after compression calculated by the compression size calculating section.

An image processing apparatus according to the present invention includes a pixel number calculation section for calculating the number of text pixels and the number of chromatic pixels of each image based on pixel values of a plurality of pixels constituting the image and a weighting section for multiplying the number of text pixels by a first weighting coefficient and multiplying the number of chromatic pixels by a second weighting coefficient to add the results of the multiplication. The image processing apparatus is characterized in that the specifying section specifies a value obtained by the weighting section as the amount of information.

An image processing apparatus according to the present invention includes a document type determination section for determining whether a document corresponding to an image is a color document or a black-and-white document. The specifying section specifies the result, which is determined by the document type determination section, as the amount of information.

An image processing apparatus according to the present invention is characterized by including the image processing apparatus according to any one of the above-mentioned inventions and an image forming section for forming an image based on the file compressed by the image processing apparatus on a sheet.

A non-transitory computer-readable recording medium according to the present invention recording a computer program for compressing image data obtained by reading a plurality of documents into a file that causes a computer to execute a step of specifying an amount of information of an image of each of the plurality of documents and a step of calculating a size after compression of the image in accordance with the specified amount of information, and a step of compressing the image data by using the calculated size after compression.

According to the present invention, it is possible to equalize the image quality of an image at each page in a case of compressing images over a plurality of pages.

The above and further objects and features will more fully be apparent from the following detailed description with accompanying drawings.

BRIEF DESCRIPTION OF THE DRAWINGS

FIG. 7 is an explanatory drawing showing an example of a method for specifying an amount of information by a compression size calculation section according to Embodiment 1.

FIG. 8 is an explanatory drawing showing an example of a method for calculating a compression size by the compression size calculation section according to Embodiment 1.

FIG. 9 is an explanatory drawing showing an example of the number of area pixels in the images over a plurality of pages.

FIG. 10 is a schematic view showing description amount of images over a plurality of pages.

FIG. 11 is an explanatory drawing showing an example of the compression sizes of images over a plurality of pages.

FIG. 13 is an explanatory drawing showing an example of a method for specifying an information amount by a compression size calculation section according to Embodiment 2.

FIG. 14 is an explanatory drawing showing an example of a method for calculating a compression size by the compression size calculation section according to Embodiment 2.

FIG. 15 is an explanatory drawing showing an example of the compression sizes of images over a plurality of pages according to Embodiment 3.

DETAILED DESCRIPTION

Embodiment 1

Figure 1:
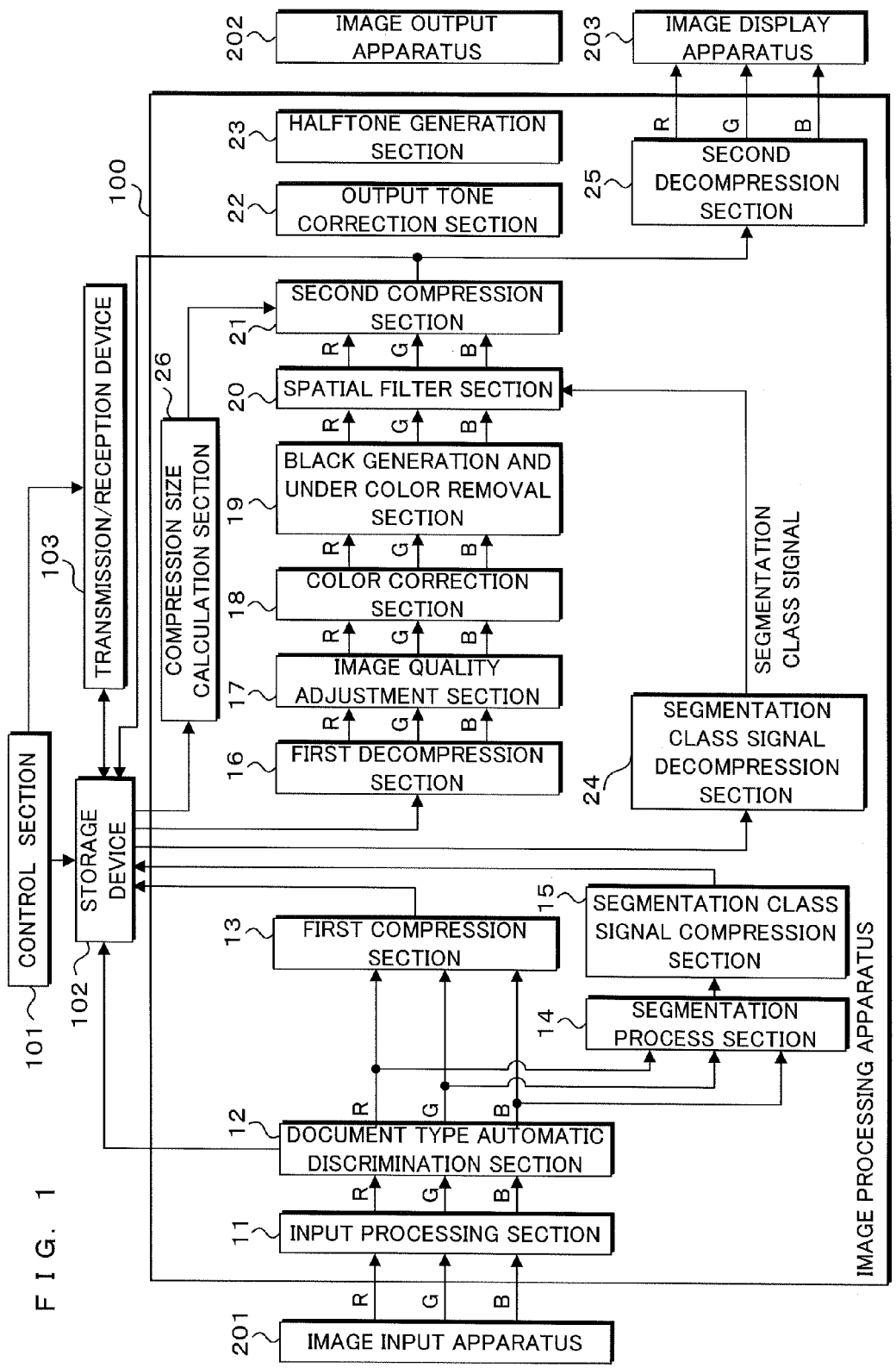
FIG. 1 is a block diagram showing an example of the configuration of an image forming apparatus according to Embodiment 1.

The present invention is described hereinafter based on the drawing indicative of an embodiment. FIG. 1 is a block diagram showing an example of the configuration of an image forming apparatus according to Embodiment 1. As shown in FIG. 1, the image forming apparatus includes an image processing apparatus 100, an image input apparatus 201, an image output apparatus 202, an image display apparatus 203, a control section 101, a storage device 102 and a transmission/reception device 103.

The image forming apparatus according to the embodiment is a digital color multi-function printer having different modes such as a copier mode, a print mode, a facsimile transmission mode, a facsimile reception mode, an image transmission mode and the like. When the user selects any mode among these modes, the image forming apparatus executes the selected mode.

The image transmission modes are described hereinafter according to the present embodiment. The image transmission mode refers to, for example, (1) a mode (scan to e-mail mode) that the images (also called image data) obtained by reading a document are attached to an e-mail and then transmitted to the designated address; (2) a mode (scan to ftp mode) that the images obtained by reading a document are sent to a folder designated by a user; (3) a mode (scan to usb mode) that the images obtained by reading a document are sent to a USB memory or the like attached to the image forming apparatus.

The image input apparatus 201 is configured by a scanner section provided with, for example, a CCD (Charged Coupled Device) line sensor and converts a reflective image from a document to an electrical RGB (R; red, G; green, B; blue) signal. The color image signal (RGB analog signal) inputted by the CCD line sensor is converted to a digital signal by an A/D (Analog-Digital) conversion section, and various kinds of distortion generated by the lighting system, image focusing system and image sensing system of the image input apparatus 201 is removed by a shading correction section.

The image output apparatus 202 functions as an image forming section with the use of an electrophotographic method, an inkjet method or the like by outputting image data of a document onto a recording paper (sheet). In addition, the image output apparatus 202 forms an image based on a file compressed by the image processing apparatus 100 on the recording paper (sheet).

The image display apparatus 203 is a display provided in an operation panel (not shown) of the image forming apparatus or the like, and it is possible to display a color image. In addition, the image display apparatus 203 is covered by a touch panel and functions as the input interface of the image forming apparatus. In other words, the image display apparatus 203 displays a GUI (graphic user interface) and an operation guide for performing the input of various commands to the image forming apparatus.

The control section 101 is a computer including a processor such as a CPU (Central Processing Unit), DSP (Digital Signal Processor) or the like, and controls each hardware included in the image forming apparatus. In addition, the control section 101 controls data transfer between hardware units included in the image forming apparatus.

The storage device 102 is a hard disk, a solid-state drive or the like, and stores data or information used in the processing of the image processing apparatus 100, or data or information after processing, which is processed in the image processing apparatus 100.

The transmission/reception device 103 connects to a communication line such as a telephone line, Internet or the like, and transmits data to another apparatus or receives from another apparatus which is connected to the communication line.

The image processing apparatus 100 is configured by an ASIC (Application specific integrated circuit), an FPGA (field-programmable gate array) or the like for carrying out image processing to the inputted image data (image signal).

The image processing apparatus 100 includes, for example, an input processing section 11, a document type automatic discrimination section 12, a first compression section 13, a segmentation process section 14, a segmentation class signal compression section 15, a first decompression section 16, an image quality adjustment section 17, a color correction section 18, a black generation and under color removal section 19, a spatial filter section 20, a second compression section 21, an output tone correction section 22, a halftone generation section 23, an segmentation class signal decompression section 24, a second decompression section 25, a compression size calculation section 26 and the like.

The image processing apparatus 100 transmits the image data subjected to image processing to e-mail processing section (not shown) in the scan to e-mail mode among the image transmission modes. In addition, the image processing apparatus 100 transmits the image data subjected to image processing to a predetermined folder in the scan to ftp mode. Moreover, the image processing apparatus 100 transmits the image data subjected to image processing to a predetermined USB memory in the scan to USB mode. Each section is described hereinafter.

An input processing section 11 has the function of applying a tone correction processing such as γ correction processing to the respective RGB image data inputted from an image input apparatus 201.

The document type automatic discrimination section 12 performs determination of a type of a document read by the image input apparatus 201. The type of the document can be, for example, a text document, a printed—picture document, a text printed—picture document having a mixture of text and printed—picture(halftone photograph) or the like.

The document type automatic discrimination section 12 also performs ACS (Auto Color Selection) processing as the processing for discriminating whether the read document is a color document or a black-and-white document, based on RGB data inputted from the input processing section 11. The document type automatic discrimination section 12 may also determine whether the read document is a blank page document or not.

The document type automatic discrimination section 12 outputs RGB image data to the first compression section 13 and the segmentation process section 14. In the present embodiment, a value evaluated by the document type automatic discrimination section 12 for determining a document type is stored into the storage device 102 and is used for calculating a size after compression by a compression size calculation section 26 described later. The document type automatic discrimination section 12 is described hereinafter in detail.

Figure 2:
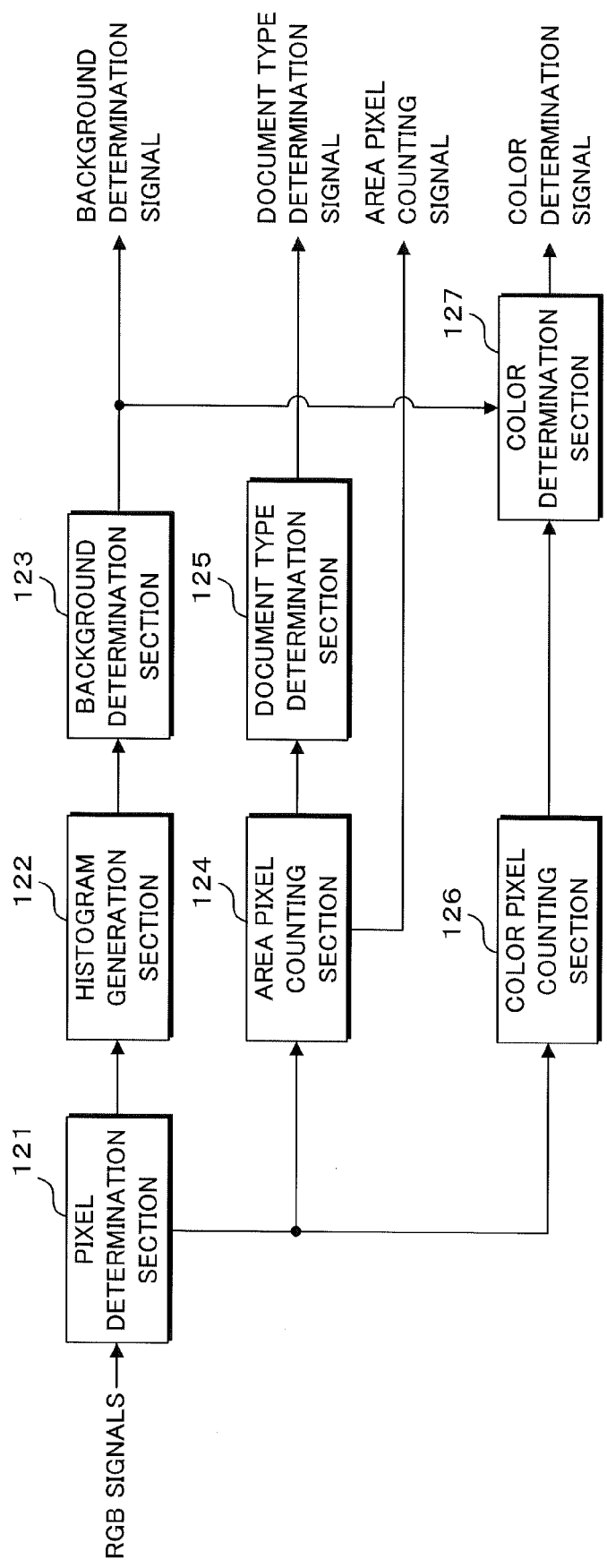
FIG. 2 is a block diagram showing an example of a configuration of a document type automatic discrimination section according to Embodiment 1.

FIG. 2 is a block diagram showing an example of the configuration of the document type automatic discrimination section 12 according to Embodiment 1. As shown in FIG. 2, the document type automatic discrimination section 12 includes a pixel determination section 121, a histogram generation section 122, a background determination section 123, an area pixel counting section 124, a document type determination section 125, a color pixel counting section 126, a color determination section 127 and the like. In addition, a size after compression is calculated by using the value evaluated by the area pixel counting section 124.

The pixel determination section 121 performs discrimination of each pixel based on the pixel values of a plurality of pixels constituting an image. The discrimination of each pixel is performed on whether the pixel is a background pixel, a photograph pixel, a text pixel, or a halftone dot pixel. In the present embodiment, for simplicity, the area pixel is also referred by grouping the background pixel, photograph pixel, text pixel, halftone dot pixel and the like.

The discrimination of each pixel, that is, the algorithm for classifying pixels of an image into segmented pixels can utilize the conventional segmentation method. For example, the type of a pixel can be discriminated by the procedure as described hereinafter.

First, (1) a minimum density (pixel value) and a maximum density in a pixel block by n×m (for example, 7 pixels×15 pixels) containing the target pixel are calculated. Next, (2) a maximum density difference is calculated by using the calculated minimum density and maximum density. Next, (3) a total density busyness, which is the total of absolute values of density difference of pixels adjacent to the target pixel, is calculated (for example, the sum of the values calculated with respect to a main scanning direction and a sub-scanning direction). Next, (4) the comparison between the calculated maximum density difference and a maximum density difference threshold value and the comparison between the calculated total density busyness and a total density busyness threshold value are performed.

Next, (5) in a case of the maximum density difference is smaller than the maximum density difference threshold value and the total density busyness is smaller than the total density busyness threshold value, it is determined that the target pixel belongs to a background/photograph area (continuous tone photograph area). (6) In a case where the above-mentioned conditions are not fulfilled, it is determined that the target pixel belongs to a text/halftone dot area.

Next, (7) with regard to the pixel determined as belonging to the background/photograph area, when the target pixel meets the condition of the maximum density difference is smaller than a background/photograph determination threshold value, the target pixel is determined as a background pixel; and when the target pixel does not meet the above-mentioned condition, the target pixel is determined as a photograph pixel.

Next, (8) with regard to the pixel determined as belonging to the text/halftone dot area, when the target pixel meets the condition of the total density busyness is smaller than the value obtained by multiplying a maximum density difference and a text/halftone dot determining threshold value, the target pixel is determined as a text pixel; and when the target does not meet the above-mentioned condition, the target pixel is determined as a halftone dot pixel. The above-mentioned procedure is also described in Japanese Patent Application Laid-Open No. 2002-232708.

The pixel determination section 121 determines whether each of the pixels constituting an image is a chromatic pixel or an achromatic pixel. The well-known color determination method (chromatic/achromatic determination method) can be used for an algorithm for color determination. For example, the method described in Japanese Patent Application Laid-Open No. 2005-286571 or the like can be used. Moreover, in the description below, a processing example of using the RGB signals is described, however, the CMY signals subjected to complementary color transformation of the RGB signals can also be used. Alternatively, color space transformation can also be performed on the RGB signals into the CIE1976L*a*b*signals (CIE: Commission International de l' Eclairage, L*: luminosity, a*, b*: chromaticity) and then determination processing may be carried out therefor. Signal conversion processing is carried out while the CMY signals subjected to complementary color transformation or the CIE1976L*a*b*signals are used.

With regard to the procedure of color determination, first, (1) for RGB signals, in a pixel block of n×m (for example, 3 pixels×3 pixels) centering around a target pixel, an average value is calculated for each input signal, and a maximum density difference value is evaluated based on the maximum value and minimum value of the calculated average value of each signal.

Next, (2) a comparison between the calculated maximum density difference value and a preset chromatic determination threshold value (for example, 10 or the like) is performed. When the maximum density difference value is larger than the chromatic determination threshold value, the target pixel is determined as a chromatic pixel; and when the maximum density difference value is smaller than the chromatic determination threshold value, the target pixel is determined as an achromatic pixel.

In addition, the processing at the pixel determination section 121 may perform a pre-scan before a main scanning, and may perform a processing by using the image data temporarily stored in storage device such as a hard disk or the like.

The area pixel counting section 124 counts the number of area pixels (for example, the number of pixels of an image for one page) determined by the pixel determination section 121. In other words, the area pixel counting section 124 counts the number of background pixels, photograph pixels, text pixels and halftone dot pixels, respectively, for an image of each page.

The color pixel counting section 126 counts the number of chromatic pixels and achromatic pixels (for example, the number of chromatic or achromatic pixels of an image for one page) determined by the pixel determination section 121. In other words, the color pixel counting section 126 counts the number of color pixels (also called the chromatic pixels) and black-and-white pixels (also called the achromatic pixels), respectively, for an image of each page.

In addition, with the present embodiment, the count values of the area pixels and the color pixels counted by the area pixel counting section 124 and the color pixel counting section 126 are stored to be associated with the processing page in the storage device 102. The count value stored in the storage device 102 is refereed by the compression size calculation section 26 mentioned later and used for calculating a size after compression of each page.

The histogram generation section 122 compares an average value of every color component of background pixels with regard to the target pixel determined as a background pixel by the pixel determination section 121. The histogram generation section 122 calculates a minimum value of the average value of respective color components for each target pixel and then generates a minimum value histogram. The number of density bins of a histogram can be made to be sixteen, for example, a first density bin with the smallest pixel values, a second density bin with the next smallest pixel values, and a sixteenth density bin with the largest pixel values. However, it is not limited to this case.

The background determination section 123 determines the existence or non-existence of a background.

Figure 3A:
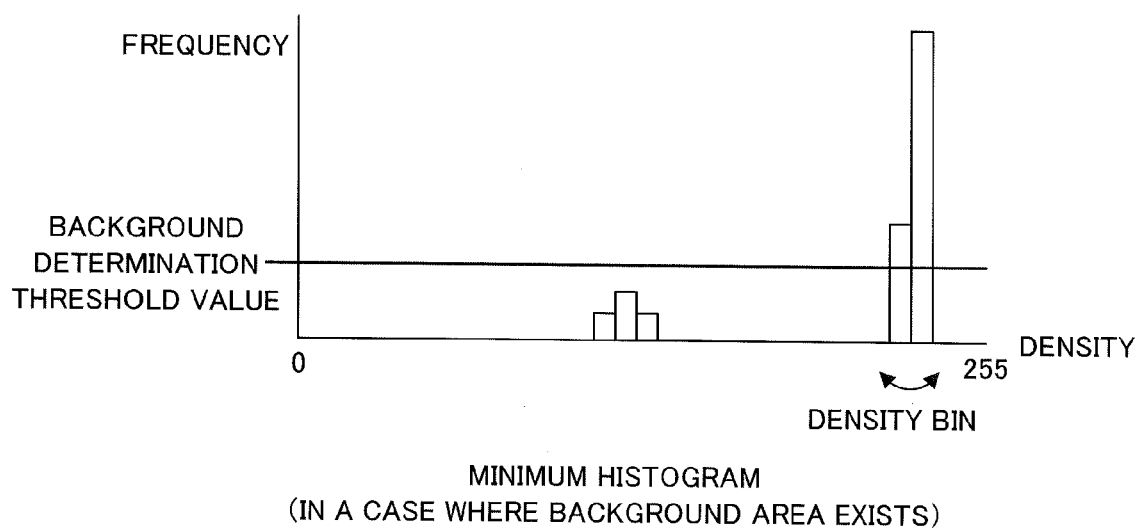
FIG. 3A is an explanatory drawing showing an example of a minimum value histogram of background pixels by a background judgment section according to Embodiment 1.
Figure 3B:
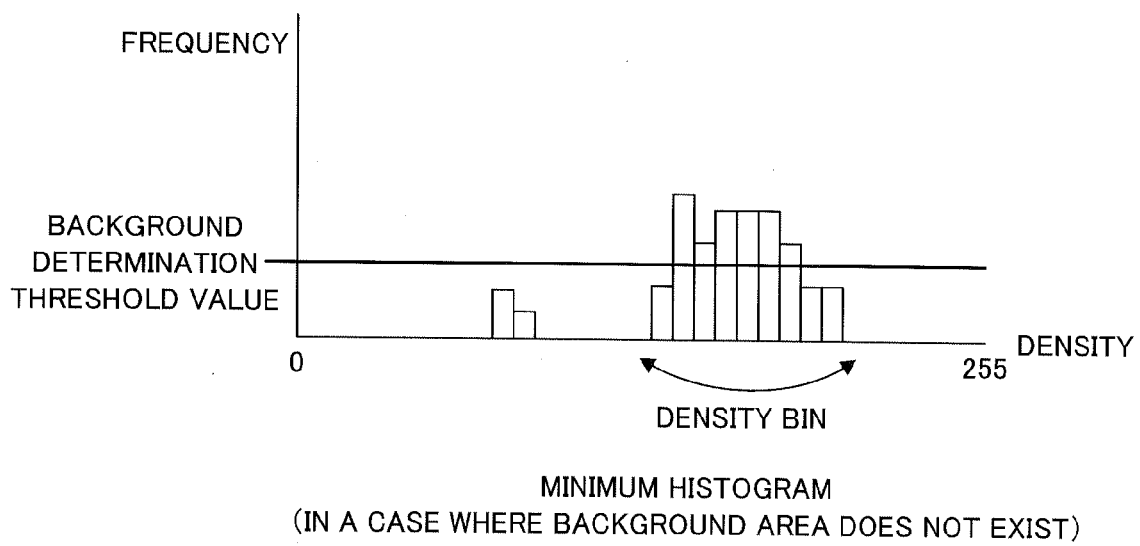
FIG. 3B is an explanatory drawing showing an example of a minimum value histogram of background pixels by a background judgment section according to Embodiment 1.

FIG. 3 is an explanatory drawing showing an example of a minimum value histogram of background pixels by the background determination section 123 according to Embodiment 1. FIG. 3A shows an example of a case where background area exists, and FIG. 3B shows an example of a case where background area does not exist. In FIG. 3, the horizontal axis indicates a density for specifying a density bin, and the vertical axis indicates a frequency as the frequency of the minimum value belonging to each density.

Since a background area has only pixels with uniform density, in a case of having a background, frequencies are centered on the limited group of density bins (for example, centered on the density bins comprising one bin or two bins) as shown in FIG. 3A. On the other hand, in a case of having no background, bins with values equal to or larger than a fixed value are distributed widely, as shown in FIG. 3B. In addition, in a case of having no background, it results in the distribution having no group of density bin with a large frequency, which is not illustrated.

The background determination section 123 determines that a background is existence in a case of having a group of density bins with the frequency being larger than a background determination threshold value and the width of the density bin being smaller than a threshold value of the width of background determination bin (for example, three or the like). The background determination threshold value can be set, for example, as 10000 when the output sheet size is presumed as an A4 size.

In addition, the lowest density bin value among a group of density bins determined as a background is called a background density value, and the total of the frequency belonging to the group of background density bins is called a background frequency. In addition, in a case of using RGB signals, a pixel with a value close to "0" has higher actual density (the expression "density becomes lower" is used in the present embodiment), and a pixel with a value close to "255" has lower density (the expression "density becomes higher" is used in the present embodiment).

For example, the method described in Japanese Patent Application Laid-Open No. 2000-354167 can also be used for determining background pixels. In this method, firstly, a G signal is extracted from the input image data and then a histogram is created by, for example, dividing the density having 256 tone levels into 16 bins. In the area corresponding to a value equal to or larger than a minimum value (a first threshold value) of the pixel values determined as background and a minimum value (a second threshold value) of the number of pixels determined as a background, that is, the area considered as a background, a pixel with lower value is searched, and the density bin (class value) being equal to or more than the first threshold value is extracted as a background.

Moreover, instead of a G signal, a luminance component from RGB components is calculated based on the conversion formula such as $Yj=0.30\,Rj+0.59\,Gj+0.11\,Bj$ and then the calculated luminance signal may be used. Herein, $Yj$ is a luminance component, and $Rj$, $Gj$ and $Bj$ are indicative of respective color components.

The document type determination section 125 determines a type of a document. The document type determination compares the number of area pixels counted by the area pixel counting section 124 to the predetermined threshold values corresponding to the background area, photograph area, halftone dot area and area, respectively, and then determines the type of the document.

For example, when the percentage of text pixels to the total number of pixels is equal to or larger than 30%, the document can be determined as a text document. When the percentage of halftone dot pixels to the total number of pixels is equal to or larger than 20%, the document can be determined as a halftone dot document. When the percentage of photograph pixels to the total number of pixels is equal to or larger than 10%, the document can be determined as a photograph document.

If the percentages of text pixels and halftone dot pixels are equal to or larger than the respective thresholds values, the document is determined as a text/halftone dot document (text/printed-picture document). The above-mentioned method is an example. The determination may also be carried out by using a well-known identification technique such as a support vector machine. In this case, the discrimination is carried out in which image data of a document type which is determined in advance is input as teaching data for learning.

The color determination section 127 determines whether the document is a document to be processed as color with the use of the number of pixels counted by the color pixel counting section 126 or a document to be processed as black-and-white (monochrome).

The color determination section 127 compares average values of respective color components of color pixels (chromatic pixel) determined by the pixel determination section 121, calculates a minimum value of the average values of respective color components for each of the color pixels, and generate a color pixel minimum value histogram.

The color determination section 127 determines whether the document is a document to be processed as color or a document to be processed as monochrome by making comparison between the number of color pixels counted by the color pixel counting section 126 and a predetermined color determination counting threshold value. With regard to the threshold value used for determination, a threshold value may be prepared for each document size in advance. Alternatively, a standard document size may be set in advance, and a threshold value (reset threshold value) depending on the standard document size may be calculated based on the proportion of an actual document size to the standard document size and then be used.

In a case where the number of color pixels counted by the color pixel counting section 126 is larger than a color determination counting threshold value (when it is determined as a color document), it is determined whether the document is to be conclusively determined as a color document in accordance with the determination result by the background determination section 123. For a document (a document with large portion of photographs such as a halftone photograph document, continuous tone photograph document, or the like) without the need of a background removal processing, it is directly determined as a color document.

On the other hand, for a document (text document, document with a large portion of text, though including photographs) requiring a background removal processing, a color pixel minimum value histogram generated by the color determination section 127 is used, and then is determined whether the document has color pixels with smaller density than a background density calculated by the background determination section 123 or not. In a case of having no color pixels with smaller density than the background density, the document is determined as a monochrome document (for example, a text document printed on a paper with color background) because all color areas are removed by a background removal processing. In a case of having color pixels with larger density than the background density, the document is determined as a color document (a document to be color-copied) because color areas remain after performing a background removal processing.

Figure 4:
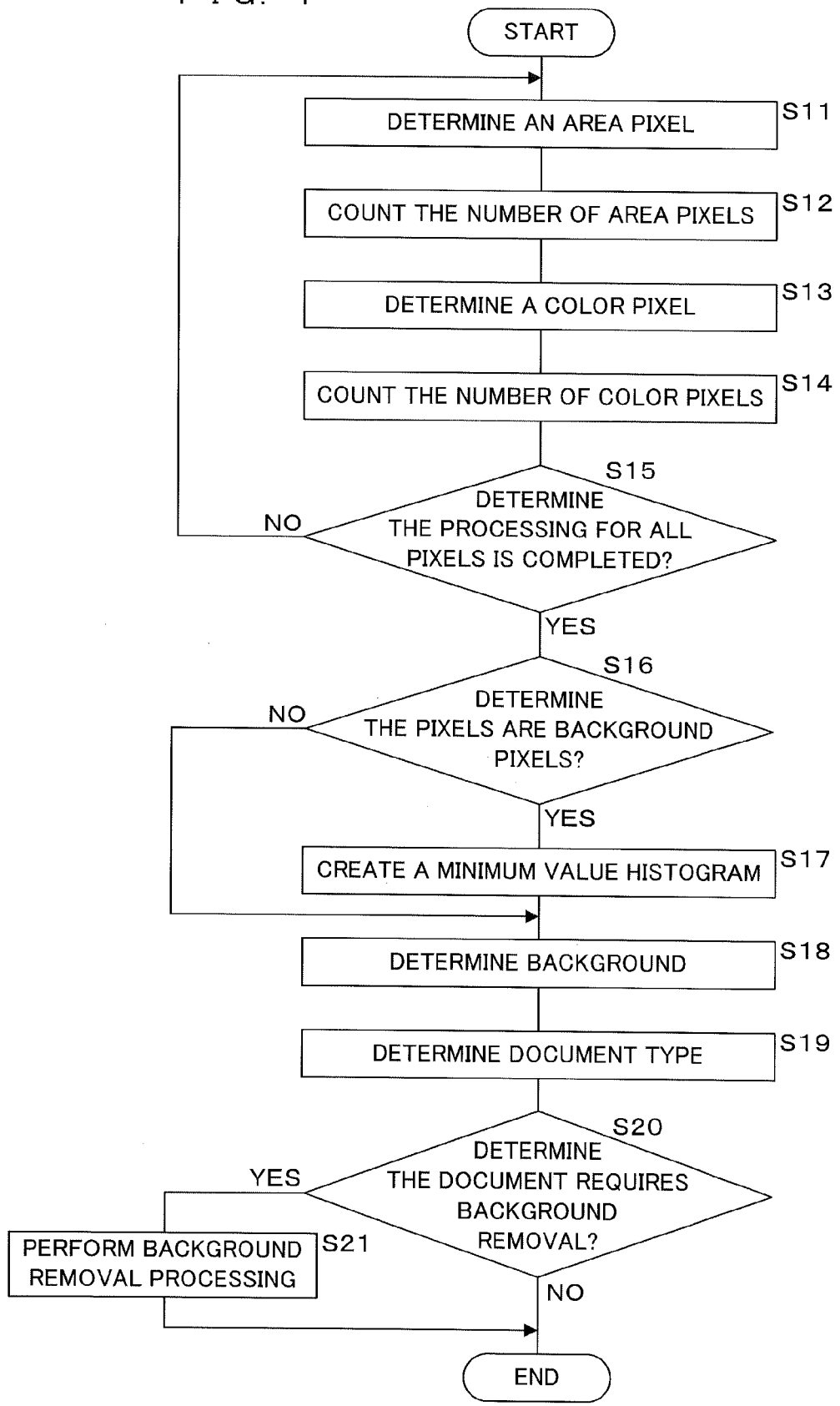
FIG. 4 is a flowchart showing an example of a processing procedure for determining a document type by a document type automatic discrimination section according to Embodiment 1.

FIG. 4 is a flowchart showing an example of a processing procedure for determining a type of a document by the document type automatic discrimination section 12 according to Embodiment 1. For the illustration of FIG. 4, the document type automatic discrimination section 12 is called the discrimination section 12 for simplicity. The processing shown in FIG. 4 is performed on an image of one page. In a case of image data obtained by reading a plurality of documents, the processing shown in FIG. 4 may be repeated for an image of each page (each document).

The discrimination section 12 determines an area pixel (S11), and then counts the number of area pixels (S12). The area pixel is, for example, a background pixel, a photograph pixel, a text pixel, a halftone dot pixel or the like. The discrimination section 12 determines a color pixel (S13), and then counts the number of color pixels (S14). In addition, the execution order for the processing of S11, S12 and the processing of S13, S14 is not limited to the example shown in FIG. 4, but the processing of S11, S12 and the processing of S13, S14 may be performed in parallel.

The discrimination section 12 determines whether the processing for all pixels in an image is completed or not (S15). In a case where the processing for all pixels has not completed yet (S15: NO), the processing after Step S11 is repeated. In a case where the processing for all pixels is completed (S15: YES), the discrimination section 12 determines whether the pixels are background pixels or not (S16).

If the pixels are background pixels (S16: YES), the discrimination section 12 creates (generates) a minimum value histogram (S17), and performs background determination (S18). If the pixels are not background pixels (S16: NO), the discrimination section 12 performs the processing of Step S18 without performing the processing of Step S17.

The discrimination section 12 determines a document type (S19), and determines whether the document is a document which requires background removal or not (S20). If the document is a document which requires background removal (S20: YES), the discrimination section 12 performs background removal processing (S21) and then completes the processing. If the document is a document which does not require background removal (S20: NO), the discrimination section 12 completes the processing without performing the processing of Step 21.

Figure 5:
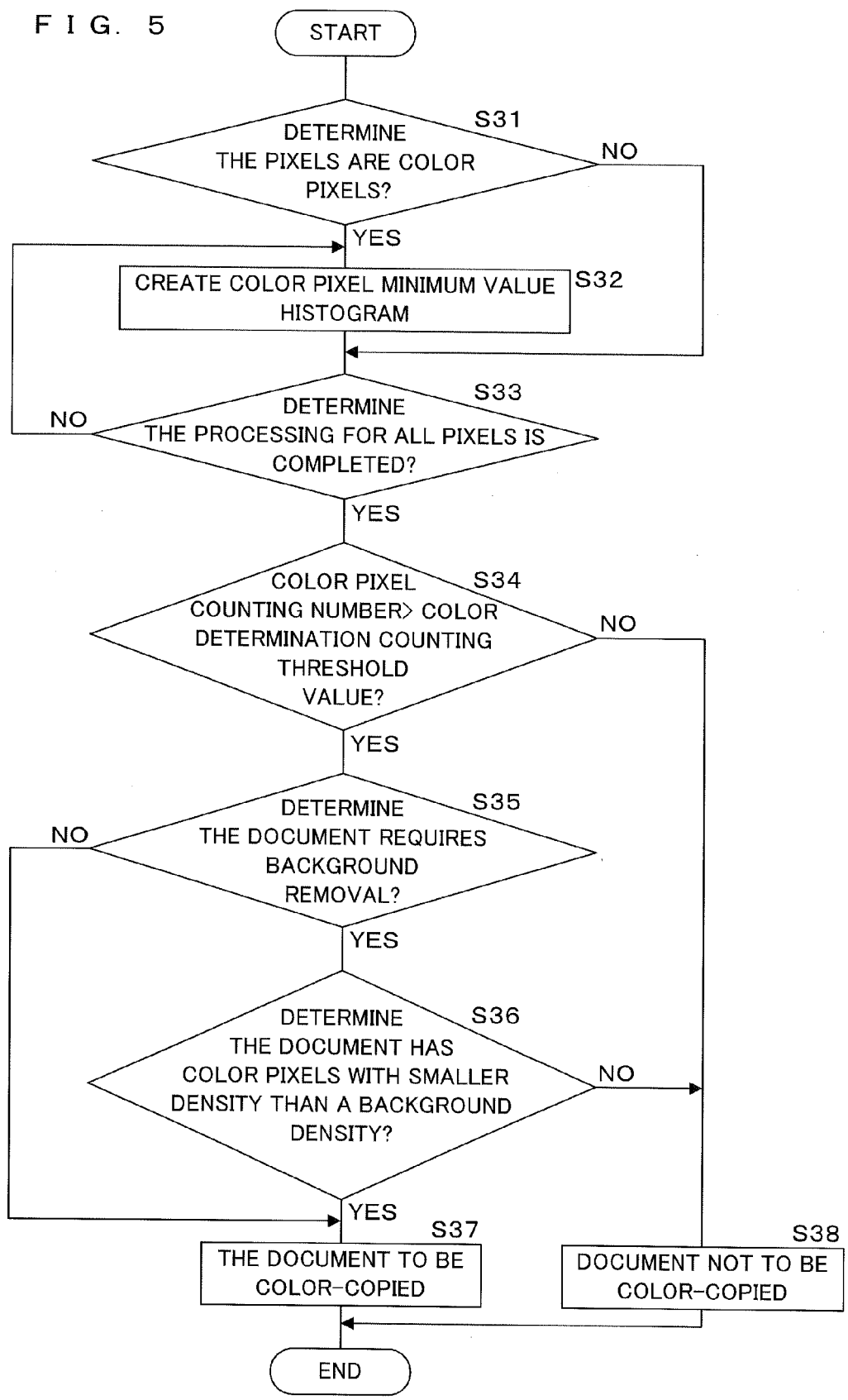
FIG. 5 is a flowchart showing an example of a processing procedure for determining a color document by the document type automatic discrimination section according to Embodiment 1.

FIG. 5 is a flowchart showing an example of a processing procedure for determining a color document by the document type automatic discrimination section 12 according to the Embodiment 1. For the illustration of FIG. 5, the document type automatic discrimination section 12 is called the discrimination section 12 for simplicity. The processing shown in FIG. 5 is performed on an image of one page. In a case of image data obtained by reading a plurality of documents, the processing shown in FIG. 5 may be repeated for an image of each page. In addition, the processing shown in FIG. 5, for example, can be performed after Step S19 shown in FIG. 4.

The discrimination section 12 determines whether the pixels are color pixels or not (S31). If the pixels are color pixels (S31: YES), the discrimination section 12 creates (generates) a color pixel minimum value histogram (S32) and determines whether the processing for all pixels of an image is completed or not (S33). If the pixels are not color pixels (S31: NO), the processing of Step S33 is performed without performing the processing of Step S32.

The discrimination section 12 repeats the processing after Step 31 in a case where the processing for all pixels has not completed yet (S33: NO). In a case where the processing for all pixels is completed (S33: YES), the discrimination section 12 determines whether the color pixel counting number (the number of color pixels counted) is larger than the color determination counting threshold value or not (S34).

The discrimination section 12 determines whether the document is a document which requires background removal or not (S35) in a case where the color pixel counting number is larger than the color determination counting threshold value (S34: YES). In a case where the document is a document which requires background removal (S35: YES), the discrimination section 12 determines whether the document has color pixels with smaller density than a background density or not (S36).

In a case of having color pixels with smaller density than a background density (S36: YES), the discrimination section 12 determines the document is a document to be color-copied (S37) and then completes the processing. In a case where the document is not a document subjected to background removal (S35: NO), the discrimination section 12 performs the processing of Step S37 without performing the processing of Step S36.

In a case where the color pixel counting number is not larger than a color determination counting threshold value (S34: NO) or in a case of having no color pixels with smaller density than a background density (S36: NO), the discrimination section 12 determines the document is not to be color-copied (S38), and then completes the processing.

As described above, the document type automatic discrimination section 12 functions as the pixel number calculation section for calculating numbers of text pixels and chromatic pixels in an image based on pixel values of a plurality of pixels constituting the image.

The segmentation process section 14 determines to which area such as a black text area, a color text area, a halftone dot area, a photograph area (a continuous tone area) or the like each pixel of an image (image data) belongs with the use of a method equivalent to the pixel determination method employed by the pixel determination section 121. The determination result indicative of an area where each pixel belongs to, detected by the segmentation process section 14, is used for selecting a filter on a process by the spatial filter section 20 described later as a segmentation class signal. Therefore, the segmentation class signal is held to also include a position information where a pixel exists and an area information where a pixel belongs to. In addition, on the document type automatic discrimination section 12, the positional information of pixels is not necessary as long as the number of discriminated pixels is obtained. In addition, the segmentation process section 14 may determine in which area a pixel block belongs for each pixel block consisting of a plurality of pixels in place of the configuration for determining in which area a pixel belongs for each pixel as described above.

The first compression section 13 performs encoding of image data (RGB signal) outputted from the document type automatic discrimination section 12. In addition, the encoding may be performed based on, for example, the JPEG (Joint Photographic Experts Group) method.

The segmentation class signal compression section 15 performs encoding of a segmentation class signal outputted from the segmentation process section 14. The encoding can be performed based on, for example, the MMR (Modified Modified READ (Relative Element Address Designate) method, MR (Modified READ (Relative Element Address Designate)) method or the like as lossless compression.

Next, the temporary saving (storage) in the storage device 102 is described. The control section 101 temporarily saves an encoded image signal (encoded image data) outputted from the first compression section 13 and an encoded segmentation class signal (compressed segmentation class signal) outputted from the segmentation class signal compression section 15 and controls to be read out in an arbitrarily timing. Since the present embodiment reads a plurality of documents and determines the size after compression for an image of each page, the control section 101 controls the later-stage processing (processing restart) not to be performed until the information of all the documents is saved into the storage device 102.

Figure 6:
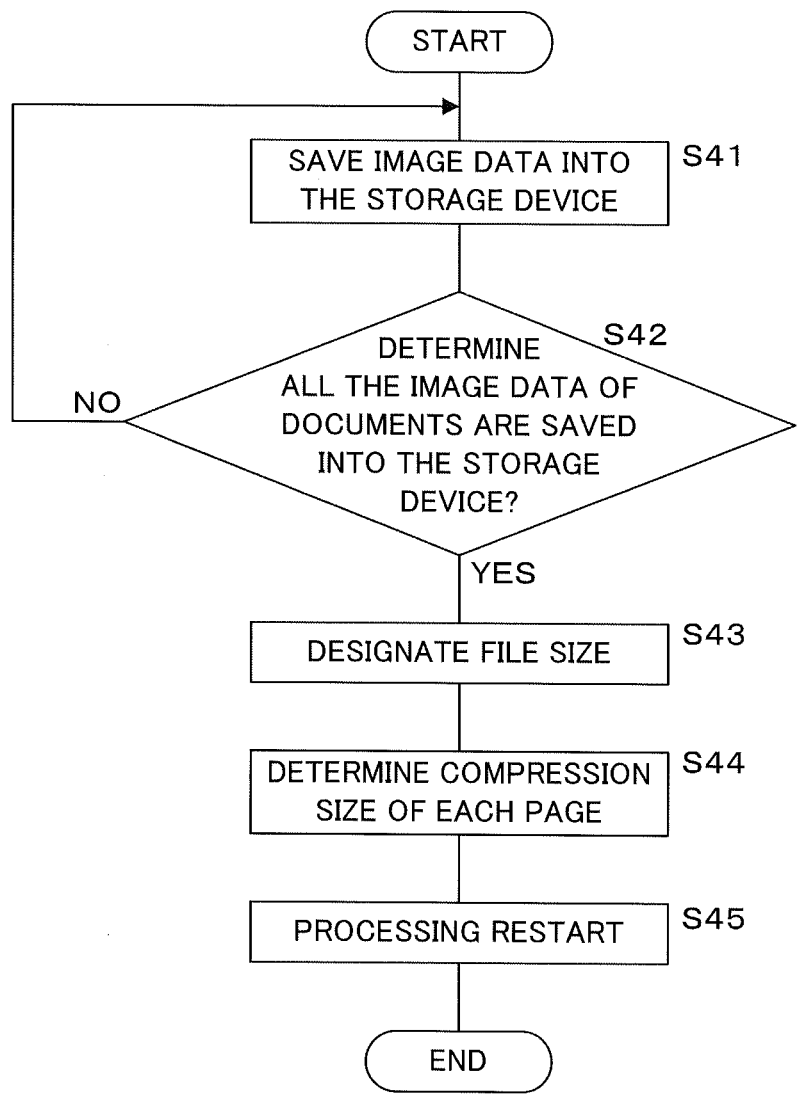
FIG. 6 is a flowchart showing an example of a procedure for processing restart by a control section according to Embodiment 1.

FIG. 6 is a flowchart showing an example of a procedure for the processing restart by the control section 101 according to Embodiment 1. The control section 101 saves (stores) image data (containing encoded image data and compressed segmentation class signals) into the storage device 102 (S41). The control section 101 determines whether all the image data of documents are saved into the storage device 102 or not (S42). In a case where all the image data of documents are not saved into the storage device 102 (S42: NO), the processing of Step S41 is repeated.

In a case where all the image data of documents are saved into the storage device 102 (S42: YES), the control section 101 designates a file size by requesting a user to input a conclusive file size (S43). In addition, as for the file size, in place of the configuration in which the user inputs the file size with an operation panel (not shown), a value stored by an administrator in the image forming apparatus before the processing in FIG. 6 (for example, the value inputted from an operation panel not shown) or the value set at the time of shipping or the like of the image forming apparatus may be referred to.

The control section 101 determines a compression size of each page, that is, a size after compression (S44). In addition, the determination of a file size after compression determines a size after compression of the image of each page calculated by the compression size calculation section 26 based on the file size inputted by a user and the discrimination result of the document type automatic discrimination section 12. Determination of a compression size is described below in detail.

The control section 101 performs a processing restart (S45), and then completes restart processing. In other words, in a case where sizes after compression of image of each 1 page are determined, the control section 101 reads out the image data temporarily stored into the storage device 102, and performs a processing restart of outputting the read image data to the first decompression section 16 and the segmentation class signal decompression section 24 described later.

The first decompression section 16 applies decoding processing to an encoded image signal (encoded image data) so that the encoded image signal is decompressed to RGB image data.

The segmentation class signal decompression section 24 applies decoding processing to an encoded segmentation class signal (compressed segmentation class signal). The segmentation class signal decompression section 24 outputs the decoded segmentation class signal to the spatial filter section 20.

The image quality adjustment section 17 performs background removal correction on the RGB image data outputted from the first decompression section 16 in accordance with a background level detected by the document type automatic discrimination section 12. Moreover, the image quality adjustment section 17 adjusts RGB balance (color adjustment with red color, blue color or the like), brightness, saturation or the like based on the instructed setting information in a case where a user performs instruction on image quality adjustment from an operation panel (not shown).

The processing of each section up to the image quality adjustment section 17 is similarly performed when an image is displayed on the image display apparatus 203 and when print processing is performed by the image output apparatus 202. In a case where print processing is performed by the image output apparatus 202, unlike the case of displaying an image on the image display apparatus 203, the value evaluated for discriminating the document type by the document type automatic discrimination section 12 is not saved into the storage device 102. In addition, the compression size calculation section 26, the second compression section 21, the second decompression section 25 do not operate (the processing is not performed).

For the processing in each section on and after the color correction section 18, displaying an image on the image display apparatus 203 and performing a print processing by the image output apparatus 202 are described separately. First, displaying an image on the image display apparatus 203 is described.

The color correction section 18 applies processing that improves color reproducibility for image data (RGB image data suitable to the reading characteristics of a scanner) outputted from the image quality adjustment section 17. In other words, the color correction section 18 performs color correction processing that converts image data into R' G' B' image data suitable to the display characteristics of the image display apparatus 203. In addition, the color correction processing may be realized by creating an LUT (Look-Up Table) in which the input values (RGB) are associated with output values (R' G' B'), and by referring to (reading out) the output values from the LUT.

The black generation and under color removal section 19 does not operate.

The spatial filter section 20 carries out spatial filter processing (edge enhancement processing, smoothing processing and the like) by selecting a filter coefficient in accordance with a segmentation class signal for image data outputted from the color correction section 18.

The compression size calculation section 26 calculates a size after compression (data size) of an image of each page when the image data of all documents are saved into the storage apparatus 102 and the file sizes are decided. In addition, the size after compression is also referred as a compression size. In other words, the compression size calculation section 26 functions as a specifying section that specifies the respective amount of information of an image of each page. Also, the compression size calculation section 26 functions as a compression size calculation section for calculating a size after compression of the image of each page in accordance with the specified information amount. The amount of information of an image, for example, corresponds to a amount described such as text, figures or the like shown in a document corresponding to the image.

More specifically, the compression size calculation section 26 functions as a weighting section that multiplies the number of text pixel and the number of chromatic pixel calculated by the document type automatic discrimination section 12, respectively, by predetermined weighting coefficients, and specifies a weighted value as the amount of information of an image.

FIG. 7 is an explanatory drawing showing an example of a method for specifying an amount of information by the compression size calculation section 26 according to Embodiment 1. As shown in FIG. 7, the numbers of text pixels, chromatic pixels, halftone dot pixels, and photograph pixels counted by the document type automatic discrimination section 12 are represented by A, B, C and D, respectively; and the weight coefficients corresponding to the numbers of text pixels, chromatic pixels, halftone dot pixels, and photograph pixels are represented by $\alpha$(first weighting coefficient), $\beta$(second weighting coefficient), $\gamma$(third weighting coefficient) and $\delta$(fourth weighting coefficient), respectively, for an image of an arbitrary page. The information amount E of the image of the page is calculated by the formula $E=\alpha \times A+\beta \times B+\gamma \times C+\delta \times D$.

FIG. 8 is an explanatory drawing showing an example of the method for calculating a compression size by the compression size calculation section 26 according to Embodiment 1. With regard to the example shown in FIG. 8, it is assumed that the images over four pages are obtained by reading a plurality of documents (for example, four single-sided pages or two double-sided pages). The information amounts of the $1^{st}$ to $4^{th}$ pages are represented by E1, E2, E3 and E4, respectively. Since the amount of information of all four pages is equal to (E1+E2+E3+E4), the ratio of the amount of information for the $1^{st}$ to $4^{th}$ pages W1 to W4 is expressed as W1=E1/(E1+E2+E3+E4), W2=E2/(E1+E2+E3+E4), W3=E3/(E1+E2+E3+E4), and W4=E4/(E1+E2+E3+E4), respectively.

Suppose that the file size specified by a user is represented by a predetermined size, the compression size (data size after compression) of an image of each page can be calculated by multiplying each of the respective predetermined sizes by the ratio. The compression size of each page is added up to be the predetermined size. In addition, as described above, the predetermined size is not restricted to the value inputted by an operation panel (not shown) from a user, but it may be the value registered into the image forming apparatus by an administrator in advance, or the value set at the timing of shipping of the image forming apparatus.

A concrete example is explained hereinafter. FIG. 9 is an explanatory drawing showing an example of the number of area pixels over a plurality of pages. FIG. 10 is a schematic view showing the amount of the images over a plurality of pages. FIG. 11 is an explanatory drawing showing an example of compression sizes of the images over a plurality of pages. As shown in FIG. 10, the image of the $1^{st}$ page has more description of texts, while the images of the $2^{nd}$ and $3^{rd}$ pages have less description of texts with relatively more blank areas. On the other hand, the image of the $4^{th}$ page not just only has characters but also drawings such as color photographs or the like. In this case, as shown in FIG. 9, the number of text pixels in the image of the $1^{st}$ page is relatively large, and the numbers of text pixels in the images at the $2^{nd}$ and $3^{rd}$ pages are relatively small. On the other hand, the number of chromatic pixels in the image of the $4^{th}$ page is remarkably increased as compared with the other pages.

The above-mentioned weight coefficients $\alpha$, $\beta$, $\gamma$ and $\delta$ can be adjusted by performing a comparison of image qualities or the like in advance and then are stored into the image forming apparatus. Basically, a text area usually has a smaller proportion of the area of a document as compared with other areas such as a halftone dot area, however, in view of the text information being the most essential in a text image, the weight coefficient $\alpha$ is adjusted so as to be larger than the other weight coefficients. In the example shown in FIG. 11, the weight coefficients are set as $\alpha=1$, $\beta=0.5$, $\gamma=0.1$, and $\delta=0.05$, however, the weight coefficients are not limited to these values.

The weighting coefficient can be switched in accordance with whether color scanning is designated or not. For example, $\beta=0.5$ can be set in a case that color scanning is designated, and $\beta=0$ can be set in a case that color scanning is not designated.

The weight coefficients $\gamma$ and $\delta$ are set to be smaller than the other weighting coefficients $\alpha$, $\beta$. Since the pixels in a halftone dot area and a photograph area are basically figure parts, even if the compression ratio of an image becomes larger, the visibility of the image does not change a lot as compared with a text area or the like.

As shown in FIG. 11, in a case where the weighting coefficients $\alpha=1$, $\beta=0.5$, $\gamma=0.1$, and $\delta=0.05$ are set, the amount of information of each page is calculated. With regard to the ratio of the amount of information of each page to the total amount of information of all pages, the proportion (ratio) of the image of the $1^{st}$ page is 0.31; that of the $2^{nd}$ page is 0.11; that of the $3^{rd}$ page is 0.17; and that of the $4^{th}$ page is 0.40. Suppose that the predetermined size (predetermined file size) is set as 2048 Kbyte, with regard to the compression size in each page, the image of the 1$^{st}$ page is 641 Kbyte; the image of the 2$^{nd}$ page is 226 Kbyte; the image of the 3$^{rd}$ page is 352 Kbyte; and the image of the 4$^{th}$ page is 827 Kbyte.

In the above-mentioned example, the numbers of text pixels, color pixels (chromatic pixels), halftone dot pixels, and photograph pixels are used as the amount of information of each page. However, with the configuration in which the halftone photograph pixels are regarded as non-important information (for example, the apparatus directed to an office documents only), the numbers of text pixels, color pixels, and halftone dot pixels may be used.

In addition, the weight coefficients other than the weight coefficient α may be set as 0, only the number of pixels in a text area (text pixels) can be specified as the amount of information. Alternatively, the weighting coefficients other than the weighting coefficient β may be set as 0, and only the number of chromatic pixels can also be specified as the amount of information.

Figure 12:
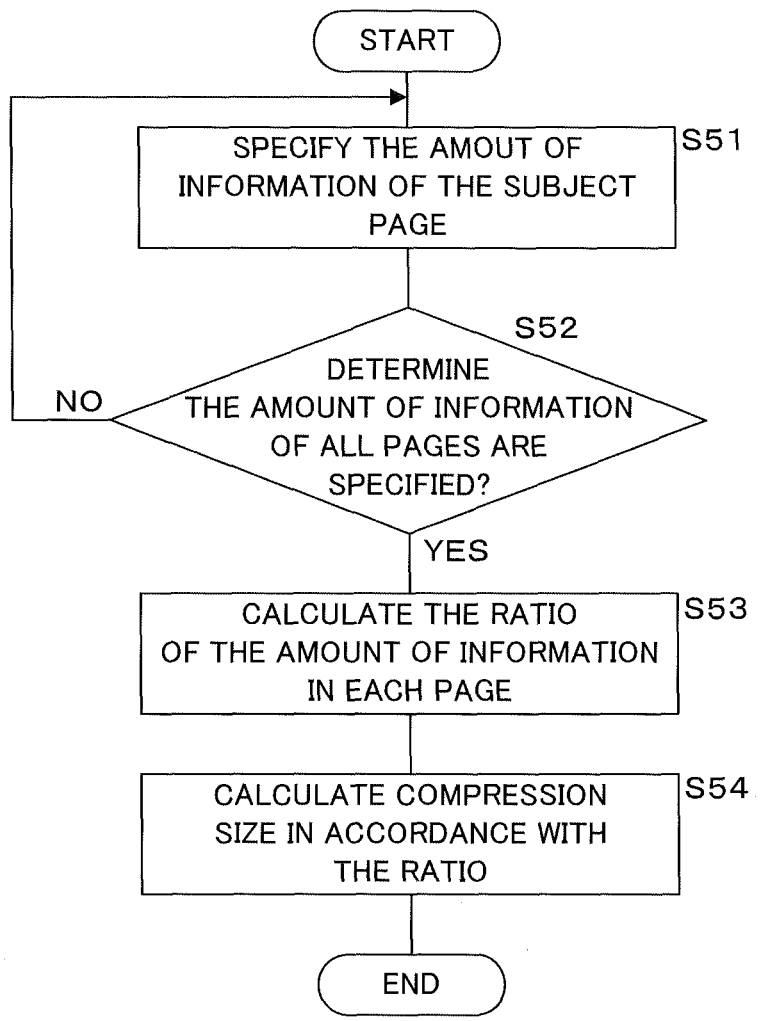
FIG. 12 is a flowchart showing an example of a processing procedure for the compression size calculation section according to Embodiment 1.

FIG. 12 is a flowchart showing an example of the processing procedure by the compression size calculation section 26 according to Embodiment 1. In the following, the compression size calculation section 26 is referred as the calculation section 26 for simplicity. The calculation section 26 specifies an amount of information of an image of the subject page (S51), and then determines whether the amount of information of an image of all pages are specified or not (S52). In addition, in this case, the specification of the amount of information includes weighting of the number of pixels.

In a case where the amount of information of all pages are not specified (S52: NO), the calculation section 26 continues to perform the processing at and after Step S51. In a case where the amount of information of an image of all pages are specified (S52: YES), the calculation section 26 calculates the ratio of the amount of information in each page (S53). The ratio is the proportion of the amount of information of the subject page with respect to the total amount of information of all pages.

The calculation section 26 calculates a compression size (size after compression) of the image of each page in accordance with the calculated ratio (S54), and then completes the processing.

As described above, in a case where a document having a plurality of pages is compressed to the specified file size (predetermined size), the size after compression of each page corresponding to the amount of information of each image of each page obtained by reading the document is calculated. Since the respective images are compressed into the calculated sizes and made into a file with the predetermined size, the image quality of the image of each page can be equalized.

In addition, as the number of text pixels is used as the amount of information, it is possible to assign a compression size so that degradation of text information by compression hardly occurs. By setting weight coefficients in particular, it is possible to calculate an appropriate compression size in accordance with the user's preference or description of a document.

In the above-mentioned embodiment, in a case where the compression size of the image at a given page calculated by the compression size calculation section 26 is too small as compared to the description amount of the document on that page, it becomes difficult to identify the content of the image at that page, therefore, outputting a warning may be possible. The correlation between the amount of information corresponding to the description amount of a document and the minimum value of the compression sizes can be retained as a table, for example, a warning is outputted in a case where the calculated compression size is smaller than the minimum value for the amount of information of the corresponding page. For example, in a case where images of ten pages are compressed into one file, when the compression size is smaller than a minimum value, the images of ten pages may be divided and compressed into two files by means of compressing images of five pages into one file. In addition, in a case where the compression size is smaller than the minimum value, the specified file size may be modified.

The second compression section 21 encodes the image data outputted from the spatial filter section 22. In this case, since the second compression section 21 performs encoding in accordance with the compression size calculated by the compression size calculation section 26. A method such as JPEG2000 is used for the encoding by the second compression section 21 in which a data size after compression may be designated for encoding.

The control section 101 saves the image data compressed by the second compression section 21 into the storage device 102, converts the data into a file format such as PDF (Portable Document Format) at the time of collecting all the encoded image data of a document, and transmits the converted file to the destination specified in advance via the transmission/reception device 103. In addition, the second compression section 21 outputs the encoded image data to the second decompression section 25 in a case where a preview display is required from a user in advance.

The second decompression section 25 decodes the encoded image data by the second compression section 21 and outputs the data to the image display apparatus 203 in a case where a user demands a preview. The second decompression section 25 uses a decoding method corresponding to the encoding method used at the second compression section 21.

The image forming apparatus according to the present embodiment causes the image display apparatus 203 to display a preview of the image to be transmitted before executing transmission in the image transmission mode.

The present embodiment shows a configuration that specifies an amount of information of an image of each page and calculates a compression size of the image of each page based on the specified amount of information for a document with a plurality of pages read by the image input apparatus 201, however, it is not limited to this case.

For example, a configuration that obtains the image data stored in a memory such as a USB (Universal Serial Bus) or the like, not a document read by the image input apparatus 201, may be used. In this case, the image processing apparatus 100 may be provided with a data input terminal having an interface that connects to a data storage such as a USB memory or SD card (Secure Digital Memory Card) for obtaining the image data saved in the data storage, and a software processing section for saving the image data sent from the data input terminal into a storage device temporarily and applying an image processing to the saved image data. The software processing section is configured by a computer equipped with, for example, a CPU. The software processing section realizes the processing similar to that of the document type automatic discrimination section 12, the color correction section 18, the spatial filter section 20, the compression size calculation section 26 and the like. The image data processed by the software processing section is stored in a data storage such as a USB memory specified by a user.

The following describes the processing from the color correction section 18 through the halftone generation section 23, in which print processing is performed by the image output apparatus 202.

The color correction section 18 performs color correction processing that converts the RGB image data outputted from the image quality adjustment section 17 into CMY image data, and improves color reproducibility to the image data.

The black generation and under color removal section 19 performs black generation that creates black (K) image data from the outputted CMY image data, which are outputted from the color correction section 18, while performing processing that generates new CMY image data by subtracting the black (K) image data from the original CMY image data. Thereby, the CMY image data is converted to CMYK 4-color image data by the black generation and under color removal section 19.

The spatial filter section 20 performs spatial filter processing (edge enhancement processing, smoothing processing or the like) by a digital filter based on an segmentation class signal for the CMYK or CMY image data outputted from the black generation and under color removal section 19.

The output tone correction section 22 performs an output γcorrection processing onto the image data outputted from the spatial filter section 20 for printing on a recording medium such as a paper or the like.

The halftone generation section 23 executes a required tone reproduction processing (half tone generation processing) for printing an image by the image output apparatus 202 by using the error diffusion method or dither method. The halftone generation section 23 outputs CMYK or CMY image data to the image output apparatus 202.

Embodiment 2

The above-mentioned Embodiment 1 uses the numbers of area pixels and values obtained by weighting pixels as the information amount of an image, however, it is not limited to this case. Embodiment 2 uses the type of a document in place of the number of area pixels. In this embodiment, the type of the document could be a color document or a black-and-white (monochrome) document. The following describes the contents different from Embodiment 1 and will not describe the contents similar to Embodiment 1.

As similar to Embodiment 1, a document type automatic discrimination section 12 (document type determination section 125) determines a type whether a document corresponding to the image of each page is in color or black-and-white.

A compression size calculation section 26 specifies a type determined at the document type automatic discrimination section 12 as the information amount of the image at each page.

FIG. 13 is an explanatory drawing showing an example of a method for specifying an information amount by the compression size calculation section 26 according to Embodiment 2. The example shown in FIG. 13 is a substitute of the example shown in FIG. 7 according to Embodiment 1. As shown in FIG. 13, Pc represents the information amount in a case where an image is a color document, and Pm represents the information amount in a case where an image is a black-and-white document.

FIG. 14 is an explanatory drawing showing an example of a method for calculating a compression size by the compression size calculation section 26 according to Embodiment 2. With the example shown in FIG. 14, images of four pages are obtained by reading a plurality of documents (for example, four single-sided pages or two double-sided pages). In addition, as shown in FIG. 14, the images of the $1^{st}$ and $4^{th}$ pages are color documents, and the images of the $2^{nd}$ and $3^{rd}$ pages are black-and-white documents. From the example shown in FIG. 13, the amount of information of the images of the $1^{st}$ and $4^{th}$ pages are Pc, and the amount of information of the images of the $2^{nd}$ and $3^{rd}$ pages are Pm.

Since the total amount of information of all four pages is 2×(Pc+Pm), the ratio of the amount of information in each of the $1^{st}$ to $4^{th}$ pages (W1~W4) is W1=Pc/2×(Pc+Pm), W2=Pm/2×(Pc+Pm), W3=Pm/2×(Pc+Pm), and W4=Pc/2×(Pc+Pm), respectively.

Suppose that a file size designated by a user is represented by a predetermined size, a compression size (data size after compression) of an image of each page can be calculated by multiplying a ratio by the predetermined size.

For example, since a color document has 3-color information of RGB as compared to a black-and-white document, in a case where the amount of information Pm of a black-and-white document is represented by 1 for convenience, it is possible to set Pc=3 as the amount of information Pc of a color document is three times larger than the amount of information Pm of a black-and-white document. In other words, in a case of Pc=3 and Pm=1, the ratios W1 to Web 4 are W1=3/8, W2=1/8, W3=1/8, and W4=3/8, respectively. For example, suppose that a predetermined size is set as 2048 Kbyte, with regard to the compression size of each page, each of the images of the $1^{st}$ and $4^{th}$ pages corresponds to 768 Kbyte, and each of the images of the $2^{nd}$ and $3^{rd}$ pages corresponds to 256 Kbyte. The values of the amount of information Pc and Pm are not limited to the above-mentioned example.

As mentioned above, as the type of a document is specified as the amount of information, it is possible to assign a compression size so that the degradation of color pages by compression does not worsen as compared to a black-and-white page.

Embodiment 3

Embodiment 3 takes both of the number of area pixels and the type of a document into consideration as the amount of information of an image.

FIG. 15 is an explanatory drawing showing an example of the compression sizes of images over a plurality of pages according to Embodiment 3. As shown in FIG. 15, the amount of information based on the number of area pixels are 5915924 (Kbyte) in the $1^{st}$ page, 2089790 (Kbyte) in the $2^{nd}$ page, 3253916 (Kbyte) in the $3^{rd}$ page, and 7630843 (Kbyte) in the $4^{th}$ page, respectively. The amount of information of each page is similar to the example shown in FIG. 11.

The $1^{st}$ and $4^{th}$ pages are color documents and the $2^{nd}$ and $3^{rd}$ pages are black-and-white documents, as in the example shown in FIG. 14. The amount of information based on the type of a document is expressed by a weighting coefficient in the example shown in FIG. 15, while the weighting coefficient is represented by 3 for a color document (corresponding to Pc) and the weighting coefficient is represented by 1 for a black-and-white document (corresponding to Pm).

The amount of information taking a document type into account can be calculated by multiplying the amount of information based on the number of pixels by a weighting coefficient. In the example shown in FIG. 15, the amount of information of the $1^{st}$ page is 17747772 (Kbyte); the amount of information of the $2^{nd}$ page is 2089790 (Kbyte); the amount of information of the $3^{rd}$ page is 3253916 (Kbyte); and the amount of information of the $4^{th}$ page is 22892529 (Kbyte).

In this case, the ratio of each of the $1^{st}$ to $4^{th}$ pages is 0.39, 0.05, 0.07 and 0.49 in order. Supposing that a predetermined size is represented by 2048 Kbyte, the compression sizes of the $1^{st}$ to $4^{th}$ pages are 798 Kbyte, 102 Kbyte, 143 Kbyte, and 1005 Kbyte in order.

In a case of using both the number of area pixels and the type of a document as the amount of information, compared to the case of using the number of area pixels as the amount of information exemplified in FIG. 11, the compression sizes on the $1^{st}$ and $4^{th}$ pages are increased, and the compression sizes on the $2^{nd}$ and $3^{rd}$ pages are decreased. As exemplified in FIG. 10, since the description amounts of the documents of the $1^{st}$ and $4^{th}$ pages are larger than those of the documents of the $2^{nd}$ and $3^{rd}$ pages, the image quality of each page can be equalized and the proportion of the compression size of a document with more description amount or the amount of information can be made larger so that the visibility of an image content can be improved.

Figure 16:
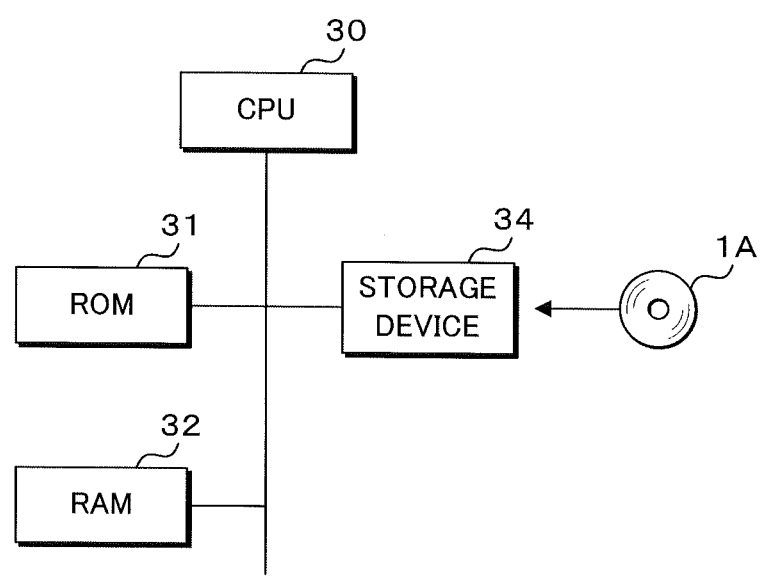
FIG. 16 is a block diagram showing a computer hardware according to Embodiment 1 through 3.

The Embodiments 1 to 3 can be realized through software with the use of a CPU (Central Processing Unit). In this case, as shown in FIG. 16, the image processing apparatus 100 includes a CPU for executing the command of a program to realize each function, a ROM (Read Only Memory) for storing the program, a RAM (Random Access Memory) for extending the program, a storage device (recording medium) such as memory for storing the program and various types of data. A recording medium recording, to be readable by a computer, the program code (executable program, intermediate code program, and source program) of the control program of the image processing apparatus 100 as a software to realize the above-mentioned functions is provided to the CPU, and then the program code recorded into the recording medium may be read and executed by the computer (or CPU and MPU).

For the recording medium, a non-transitory tangible medium, for example, a tape medium such as a magnetic tape, a cassette tape or the like; a disk medium including a magnetic disk such as a floppy (registered trademark) disk, a hard disk or the like, or an optical disk such as a CD-ROM, a MO, an MD, a DVD, a CD-R or the like; a card medium such as an IC card (inclusive of a memory card), an optical card or the like; a semiconductor memory medium such as a mask ROM, an EPROM, an EEPROM (registered trademark), a flash ROM or the like; or a logic circuit such as a PLD (Programmable logic device), an FPGA (Field Programmable Gate Array) or the like, may be used.

In addition, the image processing apparatus 100 is configured to be connectable to a communication network, and the program code may be provided through the communication network. It is to be noted that the communication network is not particularly limited as long as it is capable of transmitting the program code. As the communication network, it is possible to use the Internet, an intranet, an extranet, a LAN, an ISDN, a VAN, a CATV communication network, a Virtual Private Network, a telephone network, a mobile communication network, or a satellite communication network. In addition, a transmission medium constituting the communication network is not particularly limited to the specific configuration or type as long as a medium is capable of transmitting the program code. As the transmission medium, it is possible to use a wired type or a wireless type. The wired type includes an IEEE 1394, a USB, a power-line carrier, a cable TV line, a telephone line, an ADSL (Asymmetric Digital Subscriber Line) or the like.

The wireless type includes an infrared ray of IrDA or a remote controller, Bluetooth (registered trademark), an IEEE 802.11 radio, an HDR (High Data Rate), an NFC (Near Field Communication), a DLNA (Digital Living Network Alliance), a mobile phone network, a satellite line, a terrestrial digital network or the like. Technical features described in the above embodiments of the present invention can form a new technical solution in combination with each other.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus including a compression processing section for compressing image data obtained by reading a plurality of documents into a file, comprising:
a processor configured to:
specify an amount of information of an image of each of the plurality of documents;
calculate a size after compression of the image in accordance with the amount of information of the entire plurality of documents and the amount of information of each document specified by the processor;
calculate the number of text pixels and chromatic pixels of each image based on pixel values of a plurality of pixels constituting each image; and
multiply the number of text pixels by a first weighting coefficient and multiply the number of chromatic pixels by a second weighting coefficient to add the results of the multiplication, wherein
the image data is compressed by using the size calculated after compression, and
the processor specifying a value obtained by multiplying the number of text pixels by a first weighting coefficient and multiply the number of chromatic pixels by a second weighting coefficient to add the results of the multiplication as the amount of information.

2. The image processing apparatus according to claim 1, the processor further configured to:
determine whether a document corresponding to the image is a color document or a black-and-white document, wherein
the processor specifies the result determined by whether a document corresponding to the image is a color document or a black-and-white document as the amount of information.

3. An image forming apparatus, comprising:
the image processing apparatus according to claim 1; and
the image processing apparatus forms an image based on the file compressed by the image processing apparatus onto a sheet.

4. A non-transitory computer-readable recording medium storing a computer program for compressing image data obtained by reading a plurality of documents into a file, comprising the steps of:
causing a computer to specify an amount of information of an image of each of the plurality of documents;
causing the computer to calculate a size after compression of the image in accordance with the specified amount of information of the entire plurality of documents and the amount of information of each document;

causing the computer to compress the image data by using the calculated size after compression;

causing a computer to calculate at least the number of text pixels and chromatic pixels of each image based on pixel values of a plurality of pixels constituting each image; and causing a computer to weight at least multiplying the number of text pixels by a first weighting coefficient and multiplying the number of chromatic pixels by a second weighting coefficient to add the results of the multiplication, wherein the step of causing a computer to specify performs a process to specify a value obtained by the step of causing a computer to weight as the amount of information.

* * * * *